United States Patent
Kon (10) Patent No.: US 11,409,060 B2
(45) Date of Patent: Aug. 9, 2022

(54) OPTICAL MODULE

(71) Applicant: Enplas Corporation, Saitama (JP)

(72) Inventor: Ayano Kon, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

(21) Appl. No.: 17/272,964

(22) PCT Filed: Aug. 30, 2019

(86) PCT No.: PCT/JP2019/034111
§ 371 (c)(1),
(2) Date: Mar. 3, 2021

(87) PCT Pub. No.: WO2020/050166
PCT Pub. Date: Mar. 12, 2020

(65) Prior Publication Data
US 2021/0311265 A1    Oct. 7, 2021

(30) Foreign Application Priority Data

Sep. 3, 2018 (JP) .............................. JP2018-164292

(51) Int. Cl.
*G02B 6/42* (2006.01)
*H04B 10/25* (2013.01)
*G02B 6/12* (2006.01)

(52) U.S. Cl.
CPC ............. *G02B 6/425* (2013.01); *H04B 10/25* (2013.01); *G02B 6/12* (2013.01);
(Continued)

(58) Field of Classification Search
None
See application file for complete search history.

(56) References Cited

U.S. PATENT DOCUMENTS 6,385,374 B2 * 5/2002 Kropp .................. G02B 6/4246
385/24
6,939,058 B2 * 9/2005 Gurevich ............. G02B 6/4206
385/88
(Continued)

FOREIGN PATENT DOCUMENTS

JP     2008225339 A    9/2008
JP     2009-251375 A   10/2009

OTHER PUBLICATIONS

International Search Report from International Application No. PCT/JP2019/034111, dated Nov. 19, 2019.

*Primary Examiner* — Jerry Rahll
(74) *Attorney, Agent, or Firm* — Brundidge & Stanger, P.C.

(57) ABSTRACT

The optical module according to the present invention includes a photoelectric converter and an optical receptacle. The optical receptacle includes a first optical surface, a second optical surface, a transmission and reflection part, a recess, and a third optical surface. The transmission and reflection part is secured to the inner surface of the recess at a position that does not coincide with the optical path of signal light. The transmission and reflection part transmits the signal light incident on the first optical surface toward the second optical surface. The transmission and reflection part reflects the received light incident on the second optical surface toward the third optical surface. When viewed along a direction normal to a substrate, the optical path in the recess is inclined relative to the optical path between the second optical surface and the recess.

8 Claims, 5 Drawing Sheets

(52) U.S. Cl.
CPC ........... *G02B 2006/1209* (2013.01); *G02B 2006/12088* (2013.01); *G02B 2006/12104* (2013.01)

(56) References Cited

U.S. PATENT DOCUMENTS

| | | | |
|---|---|---|---|
| 7,539,367 B2 * | 5/2009 | Tamura | G02B 6/4214 |
| | | | 385/14 |
| 8,737,784 B2 * | 5/2014 | Kawai | G02B 6/4292 |
| | | | 385/47 |
| 10,976,510 B2 * | 4/2021 | Kon | G02B 6/4292 |
| 2005/0238279 A1 * | 10/2005 | Fukuyama | G02B 6/4207 |
| | | | 385/14 |
| 2008/0226228 A1 | 9/2008 | Tamura | |
| 2009/0252503 A1 | 10/2009 | Ishigami | |

* cited by examiner

OPTICAL MODULE

TECHNICAL FIELD

The present invention relates to an optical module.

BACKGROUND ART

Conventionally, in optical communications using an optical transmission member such as an optical fiber or an optical waveguide, an optical module (optical transmission module) including a light emitting element such as a light emitting diode and a light receiving element such as a photodetector is used. The optical module includes an optical receptacle (optical member) that allows, to be incident on an end surface of the optical transmission member, light emitted by the light emitting element and containing communication information, and, allows, to be incident on an end surface of the light receiving element, light emitted from the optical transmission member and containing communication information (e.g., see Patent Literature (hereinafter, referred to as "PTL") 1).

For example, PTL 1 describes an optical transmission module including: an optical element assembly including a transmission optical element and a reception optical element; an optical fiber; and an optical member. The optical member allows an optical signal from the transmission optical element to be incident on the optical fiber, or allows an optical signal from the optical fiber to be incident on the reception optical element. The optical member includes: a transmission lens disposed to face the transmission optical element; a fiber lens disposed to face the optical fiber; a reception lens disposed to face the reception optical element; an optical filter that reflects, toward the fiber lens, signal light incident on the transmission lens, or, transmits reception light incident on the fiber lens; and a reflective surface that reflects, toward the reception lens, the reception light transmitted through the optical filter. The optical filter is disposed to face a filter mounting surface of a filter mounting part, and is fixed such that the filter mounting part is filled with a transparent adhesive.

CITATION LIST

Patent Literature

PTL 1
Japanese Patent Application Laid-Open No. 2009-251375

SUMMARY OF INVENTION

Technical Problem

However, the adhesive is located on an optical path of the signal light or the reception light in the optical transmission module described in PTL 1. Accordingly, the optical path of the signal light or the reception light is changed due to the refractive index of the cured adhesive, the cured state of the adhesive, bubbles mixed in the cured adhesive, and/or the like. Thus, the optical coupling efficiency of the signal light or reception light may be lowered.

The present invention aims to provide an optical module capable of performing bidirectional optical communication while maintaining optical coupling efficiency of signal light and reception light.

Solution to Problem

An optical module according to the present invention includes: a photoelectric conversion device including a substrate, a light emitting element disposed on the substrate, and a light receiving element disposed on the substrate; and an optical receptacle disposed on the photoelectric conversion device and configured for optical coupling between each of the light emitting element and the light receiving element and an end surface of an optical transmission member when the optical transmission member is connected to the optical receptacle, in which: the optical receptacle includes: a first optical surface for allowing incidence of signal light emitted from the light emitting element; a second optical surface for emitting, toward the end surface of the optical transmission member, the signal light incident on the first optical surface, and allowing incidence of reception light emitted from the optical transmission member; a transmissive reflective part for transmitting, toward the second optical surface, the signal light incident on the first optical surface, and reflecting, toward the light receiving element, the reception light incident on the second optical surface; a recess for housing the transmissive reflective part; and a third optical surface for emitting, toward the light receiving element, the reception light reflected by the transmissive reflective part, the transmissive reflective part is fixed to an inner surface of the recess at a position other than an optical path of the signal light, and an optical path inside the recess as seen along a direction of a normal to the substrate is inclined with respect to an optical path between the second optical surface and the recess.

Another optical module according to the present invention includes: a photoelectric conversion device including a substrate, a light emitting element disposed on the substrate, and a light receiving element disposed on the substrate; and an optical receptacle disposed on the photoelectric conversion device and configured for optical coupling between each of the light emitting element and the light receiving element and an end surface of an optical transmission member when the optical transmission member is connected to the optical receptacle, in which: the optical receptacle includes: a first optical surface for allowing incidence of signal light emitted from the light emitting element; a second optical surface for emitting, toward the end surface of the optical transmission member, the signal light incident on the first optical surface, and allowing incidence of reception light emitted from the optical transmission member; a transmissive reflective part for reflecting, toward the second optical surface, the signal light incident on the first optical surface, and transmitting, toward the light receiving element, the reception light incident on the second optical surface; a recess for housing the transmissive reflective part; and a third optical surface for emitting, toward the light receiving element, the reception light transmitted through the transmissive reflective part, the transmissive reflective part is fixed to an inner surface of the recess at a position other than an optical path of the signal light, and an optical path inside the recess as seen along a direction of a normal to the substrate is inclined with respect to an optical path between the first optical surface and the recess.

Advantageous Effects of Invention

According to the present invention, it is possible to provide an optical module capable of performing bidirectional optical communication while maintaining optical coupling efficiency of signal light and reception light.

DESCRIPTION OF EMBODIMENTS

Hereinafter, an embodiment according to the present invention will be described in detail with reference to the accompanying drawings.

Embodiment 1

(Configuration of Optical Module)

Figure 1:
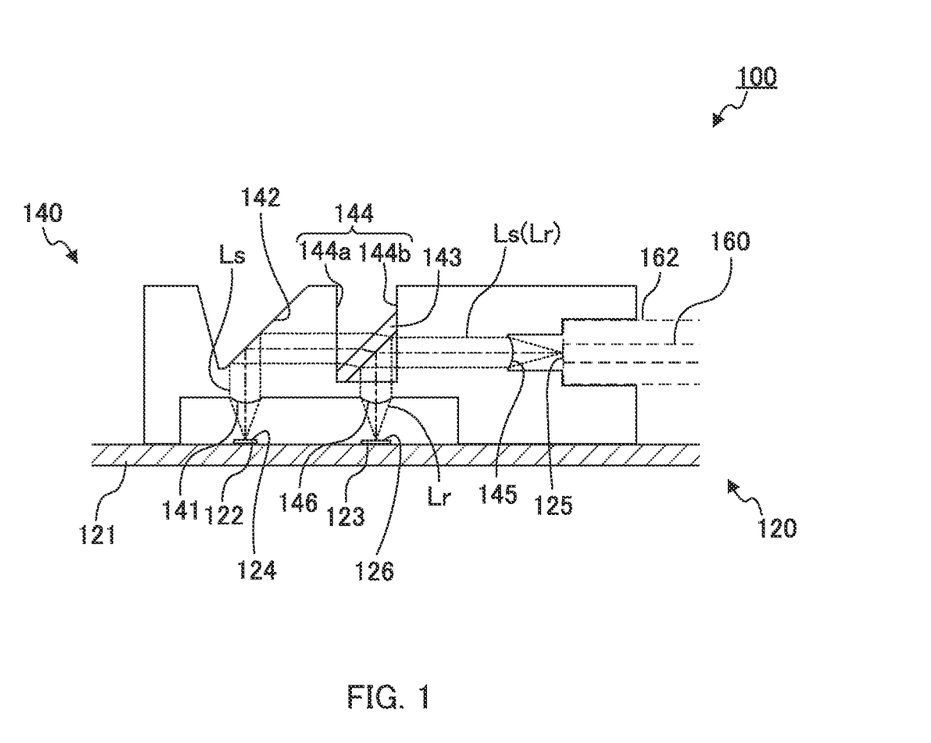
FIG. 1 is a sectional view of an optical module according to Embodiment 1.
Figure 2:
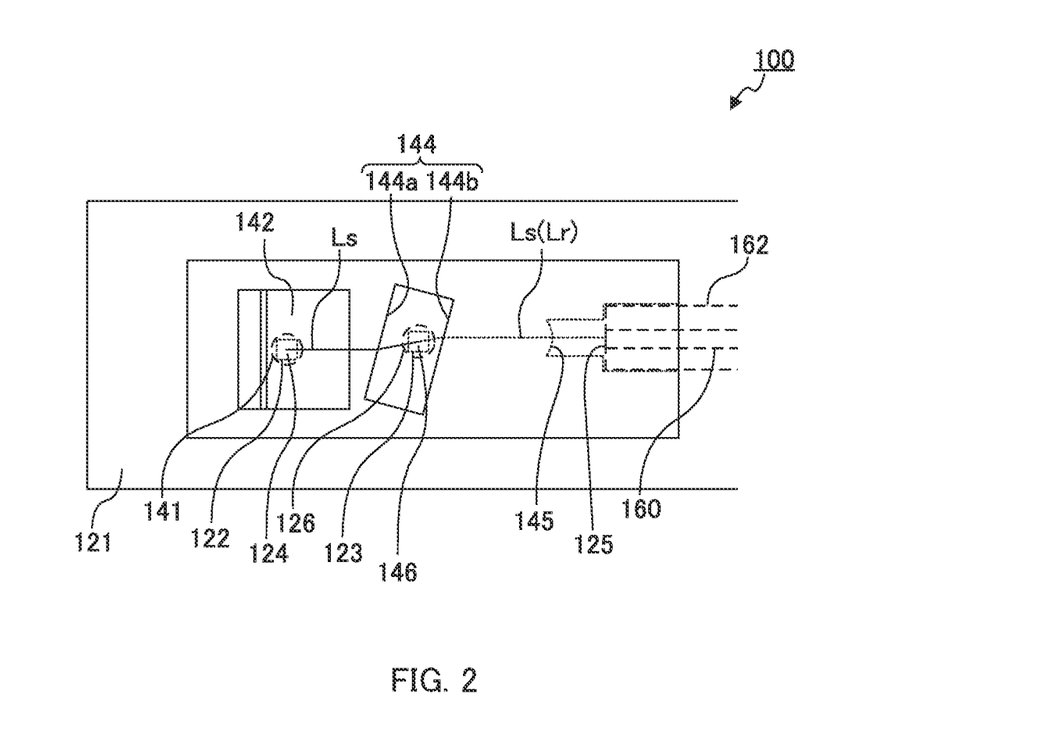
FIG. 2 is a plan view of the optical module according to Embodiment 1.
Figure 3A:
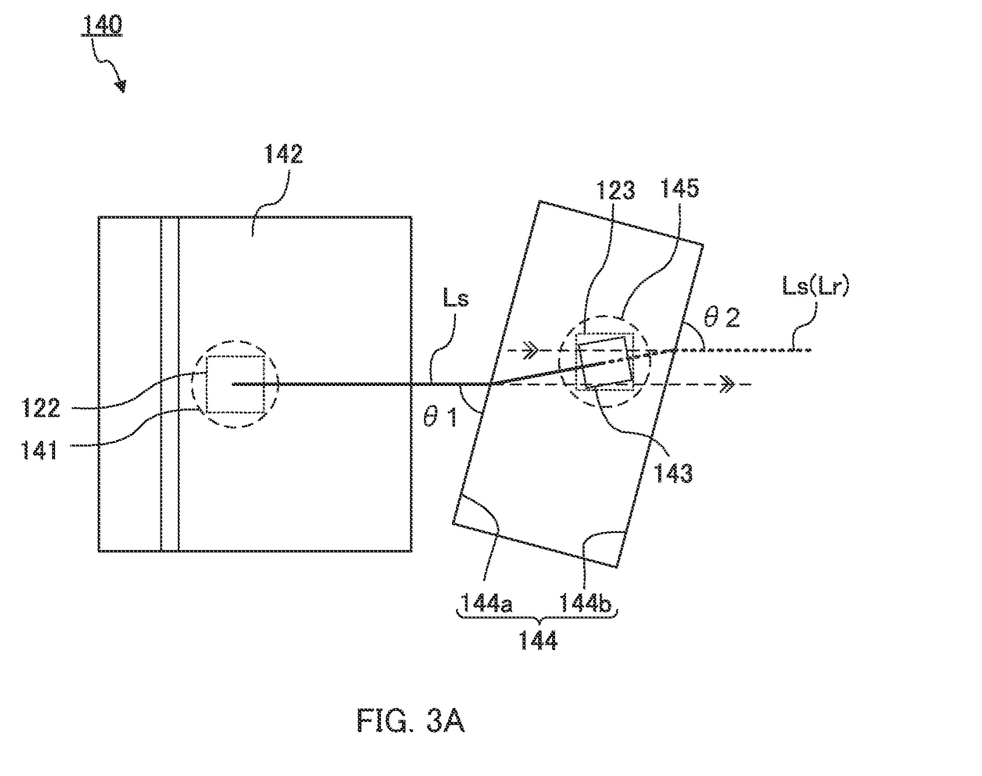
FIGS. 3A and 3B are explanatory views for explaining an inclination angle of a recess.
Figure 3B:
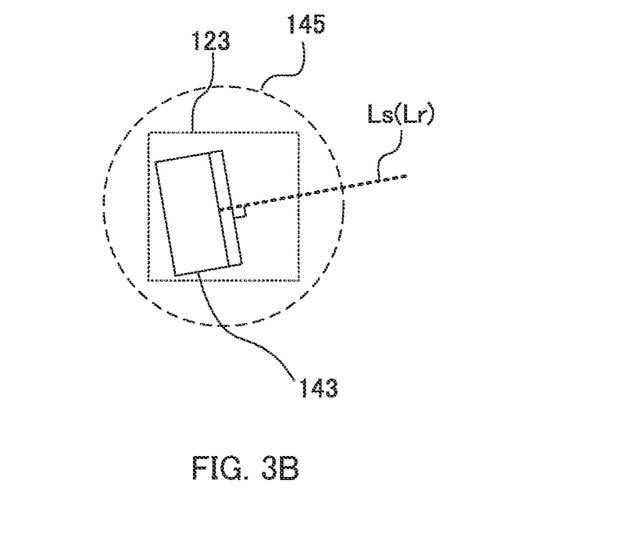

FIG. 1 is a sectional view of optical module 100 according to Embodiment 1. FIG. 2 is a plan view of optical module 100 according to the present embodiment. FIG. 3A is an explanatory view for explaining an inclination angle of a recess, and FIG. 3B is an explanatory view for explaining an inclination angle of transmissive reflective part 143 with respect to the optical axis of reception light Lr passing through recess 144 as seen in a section parallel to substrate 121. FIG. 1 illustrates an optical path in optical module 100. Further, FIGS. 3A and 3B illustrate the optical axis of the optical path in optical module 100. Note that, in FIG. 1, hatching to the section of optical receptacle 140 is omitted to illustrate the optical path inside optical receptacle 140.

As illustrated in FIGS. 1 and 2, optical module 100 includes substrate-mounted photoelectric conversion device 120 including light emitting element 122 and light receiving element 123, and optical receptacle 140. Optical module 100 is an optical module for bidirectional optical communication, and is used in a state where optical transmission member 160 is coupled (hereinafter, also referred to as "connected") to optical receptacle 140 via ferrule 162. The type of optical transmission member 160 is not particularly limited, and includes an optical fiber, an optical waveguide, and the like. In the present embodiment, optical transmission member 160 is an optical fiber. The optical fiber may be of a single mode type, or a multiple mode type. The number of optical transmission members 160 is not particularly limited. In the present embodiment, the number of optical transmission members 160 is one.

Photoelectric conversion device 120 includes substrate 121, light emitting element 122, and light receiving element 123.

Substrate 121 is, for example, a glass composite substrate, glass epoxy substrate, flexible printed circuit board, or the like. Light emitting element 122 and light receiving element 123 are disposed on substrate 121.

Light emitting element 122 is disposed on substrate 121 and emits light in a direction orthogonal to substrate 121. The light emitting element is, for example, a light emitting diode or a Vertical Cavity Surface Emitting Laser (VCSEL). The number of light emitting elements 122 is not particularly limited. In the present embodiment, the number of light emitting elements 122 is one. The position of light emitting element 122 is also not particularly limited. Further, from the viewpoint of preventing reflected light from optical transmission member 160 from returning to light emitting element 122, the optical axis of signal light Ls emitted from light emitting element 122 may be inclined in recess 144 with respect to end surface 125 of optical transmission member 160.

Light receiving element 123 is disposed on substrate 121 and receives reception light Lr emitted from optical transmission member 160. Light receiving element 123 is, for example, a photodetector. The number of light receiving elements 123 is not particularly limited, and is, for example, the same as the number of light emitting elements 122. In the present embodiment, the number of light receiving elements 123 is one.

Optical receptacle 140 is disposed on substrate 121 of photoelectric conversion device 120. Optical receptacle 140 optically couples light emitting surface 124 of light emitting element 122 to end surface 125 of optical transmission member 160 and optically couples end surface 125 of optical transmission member 160 to light receiving surface 126 of light receiving element 123 while disposed between photoelectric conversion device 120 and optical transmission member 160. Hereinafter, the configuration of optical receptacle 140 will be described in detail.

(Configuration of Optical Receptacle)

Optical receptacle 140 is optically transparent, and emits, toward end surface 125 of optical transmission member 160, signal light Ls emitted from light emitting surface 124 of light emitting element 122. Further, optical receptacle 140 emits, toward light receiving surface 126 of light receiving element 123, part of reception light Lr emitted from end surface 125 of optical transmission member 160. Optical receptacle 140 includes first optical surface 141, reflective surface 142, transmissive reflective part 143, recess 144, second optical surface 145, and third optical surface 146.

Optical receptacle 140 is formed using a material optically transparent to the light of wavelengths used for optical communications. Examples of such a material include transparent resins, such as polyetherimide (PEI), cyclic olefin resin, and the like. In addition, optical receptacle 140 is manufactured by injection molding, for example.

First optical surface 141 is an optical surface that allows, to enter the inside of optical receptacle 140, signal light Ls emitted by light emitting element 122, while refracting the signal light. First optical surface 141 may convert signal light Ls emitted from light emitting element 122 into collimated light, convergent light, or diffused light. In the present embodiment, first optical surface 141 converts signal light Ls emitted from light emitting element 122 into collimated light. In the present embodiment, first optical surface 141 has the shape of a convex lens surface convex toward light emitting element 122. Further, the shape of first optical surface 141 as seen in plan view is circular. It is preferable that the central axis of first optical surface 141 be orthogonal to light emitting surface 124 of light emitting element 122. It is also preferable that the central axis of first optical surface 141 coincide with the optical axis of signal light Ls emitted from light emitting element 122.

Reflective surface 142 is an inclined surface formed on the top surface side of optical receptacle 140, and is disposed on the optical path between first optical surface 141 and recess 144 (transmissive reflective part 143). Reflective surface 142 internally reflects, toward recess 144 (transmissive reflective part 143), the light incident on first optical surface 141 (signal light Ls emitted from light emitting element 122). Reflective surface 142 is inclined to be closer to optical transmission member 160 with increasing distance from the bottom surface toward the top surface of optical receptacle 140. In the present embodiment, the inclination angle of reflective surface 142 is 45° with respect to the optical axis of signal light Ls incident on first optical surface 141. Signal light Ls incident on first optical surface 141 is internally incident on reflective surface 142 at an incidence angle greater than a critical angle. Thus, reflective surface 142 totally reflects incident signal light Ls in a direction along the surface of substrate 121.

Transmissive reflective part 143 transmits, toward second optical surface 145, signal light Ls reflected by reflective surface 142, and reflects, toward light receiving element 123, at least part of reception light Lr incident on second optical surface 145. The configuration of transmissive reflective part 143 is not particularly limited as long as the above-mentioned function can be exhibited. In the present embodiment, transmissive reflective part 143 is a wavelength separation filter for transmitting light having a wavelength of signal light Ls and reflecting light having a wavelength of reception light Lr. In the present embodiment, transmissive reflective part 143 is inclined to be closer to second optical surface 145 (optical transmission member 160) with increasing distance from the bottom surface toward the top surface of optical receptacle 140. The inclination angle of transmissive reflective part 143 when optical receptacle 140 is seen in side view (as seen in a direction along the surface of substrate 121) is 45° with respect to the optical axis of reception light Lr incident on second optical surface 145.

Transmissive reflective part 143 is fixed to the inner surface of recess 144. Transmissive reflective part 143 is fixed to recess 144 at positions other than the optical path of signal light Ls. The method of fixing transmissive reflective part 143 to recess 144 is not particularly limited. In the present embodiment, first side surface 144a of recess 144 and the end portion of transmissive reflective part 143 located on the side of first side surface 144a are fixed to each other by an adhesive, and second side surface 144b of recess 144 and the end portion of transmissive reflective part 143 located on the side of second side surface 144b are fixed to each other by an adhesive. Further, in the present embodiment, the outer shape of transmissive reflective part 143 is processed such that, when disposed in recess 144, the transmissive reflective part is inclined at 45° with respect to the optical axis of reception light Lr when optical receptacle 140 is seen in side view (as seen in the direction along the surface of substrate 121).

As illustrated in FIG. 3B, transmissive reflective part 143 as seen in a section parallel to the surface of substrate 121 is inclined to be orthogonal to the optical axis of reception light Lr (signal light Ls) passing through the inside of recess 144.

Recess 144 houses transmissive reflective part 143 therein. The shape of recess 144 is not particularly limited as long as it can house transmissive reflective part 143. In the present embodiment, recess 144 has a substantially rectangular parallelepiped shape having first side surface 144a and second side surface 144b.

First side surface 144a is an inner surface located on the side of reflective surface 142. The shape of first side surface 144a is not particularly limited. In the present embodiment, first side surface 144a is a flat surface. Smaller angle $\theta 1$ of the angles formed by first side surface 144a and signal light Ls incident on first side surface 144a when optical receptacle 140 is seen in plan view is not particularly limited. Such angle $\theta 1$ is preferably 70 to 88° or preferably 55 to 86°. When angle $\theta 1$ is less than 70°, there is a possibility that light is partly reflected. On the other hand, when angle $\theta 1$ is greater than 88°, there is a possibility that the reflected light from optical transmission member 160 returns to light emitting element 122, thus causing noise in signal light Ls.

Second side surface 144b is an inner surface on the side of second optical surface 145. The shape of second side surface 144b is not particularly limited. In the present embodiment, second side surface 144b is a flat surface. Smaller angle $\theta 2$ of the angles formed by signal light Ls incident on second side surface 144b and second side surface 144b when optical receptacle 140 is seen in plan view is not particularly limited. Such angle $\theta 2$ is 55 to 88°, more preferably 75 to 86°, and still more preferably equal to $\theta 1$. When angle $\theta 2$ is less than 55°, there is a possibility that light is partly reflected. On the other hand, when angle $\theta 2$ is greater than 88°, there is a possibility that the reflected light from optical transmission member 160 returns to light emitting element 122, thus causing noise in signal light Ls. In other words, second side surface 144b is inclined with respect to reception light Lr incident on second optical surface 145.

When optical receptacle 140 is seen in plan view, first side surface 144a and second side surface 144b are preferably parallel to each other. That is, it is preferable that angle $\theta 1$ be the same as angle $\theta 2$. When first side surface 144a and second side surface 144b are parallel to each other, light rays before and after passing through recess 144 (the light ray before being emitted inside recess 144 at first side surface 144a and the light ray having re-entered optical receptacle 140 at second side surface 144b) become parallel to each other, so that optical receptacle 140 is easy to be designed (see the broken line in FIG. 3).

Second optical surface 145 is an optical surface that allows, to be emitted toward end surface 125 of optical transmission member 160, signal light Ls transmitted through transmissive reflective part 143, and allows, to enter optical receptacle 140, reception light Lr emitted from optical transmission member 160, while refracting the reception light. Second optical surface 145 may convert reception light Lr emitted from optical transmission member 160 into collimated light, convergent light, or diffused light. In the present embodiment, second optical surface 145 converts reception light Lr emitted from optical transmission member 160 into collimated light. In the present embodiment, second optical surface 145 is disposed on a side surface of optical receptacle 140 to face end surface 125 of optical transmission member 160. The shape of second optical surface 145 is a convex lens surface convex toward end surface 125 of optical transmission member 160. Thus, signal light Ls incident on first optical surface 141 and transmitted through transmissive reflective part 143 can be collected and efficiently connected to end surface 125 of optical transmission member 160.

Third optical surface 146 is disposed on the bottom surface side of optical receptacle 140 to face light receiving element 123. In the present embodiment, third optical surface 146 is a convex lens surface convex toward light receiving element 123. Third optical surface 146 emits, toward light receiving element 123, reception light Lr reflected by transmissive reflective part 143, while converging the reception light. Thus, reception light Lr can be efficiently coupled to light receiving element 123. The central axis of third optical surface 146 may be orthogonal or inclined with respect to light receiving surface 126 of light receiving element 123 (substrate 121).

(Optical Path Inside Optical Receptacle)

Here, the optical path inside optical receptacle 140 will be described. Signal light Ls emitted from light emitting element 122 is incident on first optical surface 141 to enter the inside of optical receptacle 140. Signal light Ls incident on first optical surface 141 is internally reflected by reflective surface 142 toward recess 144 (transmissive reflective part 143). Signal light Ls internally reflected by reflective surface 142 is transmitted through recess 144 and transmissive reflective part 143 to be emitted toward end surface 125 of optical transmission member 160 from second optical surface 145. At this time, since transmissive reflective part 143 is fixed to the inside of recess 144 at the positions other than the optical path of signal light Ls, the fixation means of transmissive reflective part 143 (e.g., adhesive) does not inhibit the progress of signal light Ls. In addition, signal light Ls reflected by reflective surface 142 is emitted inside recess 144 while refracted by first side surface 144a. Then, the signal light is transmitted through transmissive reflective part 143, is refracted by second side surface 144b, and re-enters the inside of optical receptacle 140.

On the other hand, reception light Lr emitted from optical transmission member 160 is incident on second optical surface 145 to enter the inside of optical receptacle 140. Part of reception light Lr incident on second optical surface 145 is transmitted through second side surface 144b of recess 144, and reflected by transmissive reflective part 143 toward third optical surface 146. In addition, another part of reception light Lr incident on second optical surface 145 is reflected by second side surface 144b of recess 144. At this time, when optical paths between reflective surface 142 and second optical surface 145 are seen in plan view, the optical path inside recess 144 is inclined with respect to the optical path between second optical surface 145 and recess 144. That is, second side surface 144b as seen along the direction of a normal to substrate 121 is inclined with respect to reception light Lr incident on second optical surface 145. Therefore, reception light Lr is not reflected toward second optical surface 145 (optical transmission member 160). Reception light Lr reflected by transmissive reflective part 143 is emitted from third optical surface 146, and reaches light receiving element 123.

(Effects)

As described above, in optical module 100 according to the present embodiment, since transmissive reflective part 143 is fixed to the inside of recess 144 at the positions other than the optical path of signal light Ls, the optical coupling efficiency of signal light Ls and reception light Lr can be maintained regardless of the fixing method. Further, in optical module 100 according to the present embodiment, since second side surface 144b is inclined with respect to reception light Lr incident on second optical surface 145, reception light Lr is not reflected toward second optical surface 145 (optical transmission member 160).

Note that, optical receptacle 140 may not have reflective surface 142. In this case, light emitting element 122 and first optical surface 141 are disposed on a lateral side of optical receptacle 140.

Embodiment 2

Optical receptacle 240 of an optical module according to Embodiment 2 is the same as optical receptacle 140 of the optical module according to Embodiment 1 except that optical receptacle 240 is an optical receptacle of a lens array type that supports multi-channel optical transmission. Accordingly, the same components as in Embodiment 1 are provided with the same reference numerals, and will not be described.

(Configuration of Optical Receptacle)

Figure 4A:
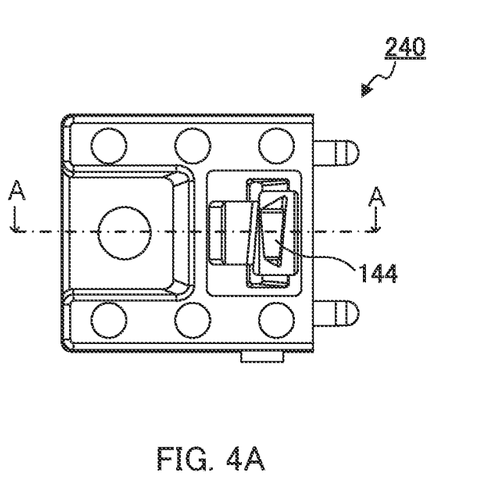
FIGS. 4A to 4D illustrate a configuration of an optical module according to Embodiment 2.
Figure 4B:
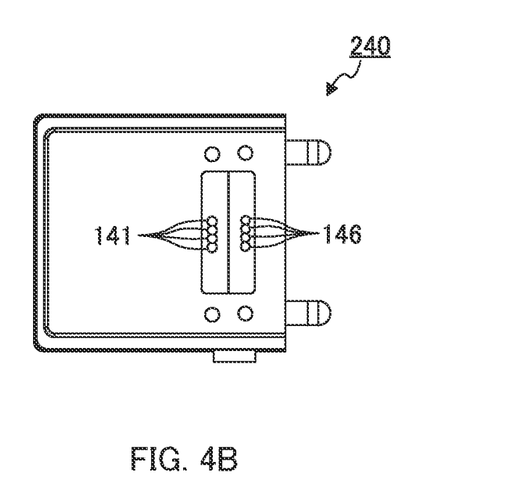
Figures 4C, 4D:
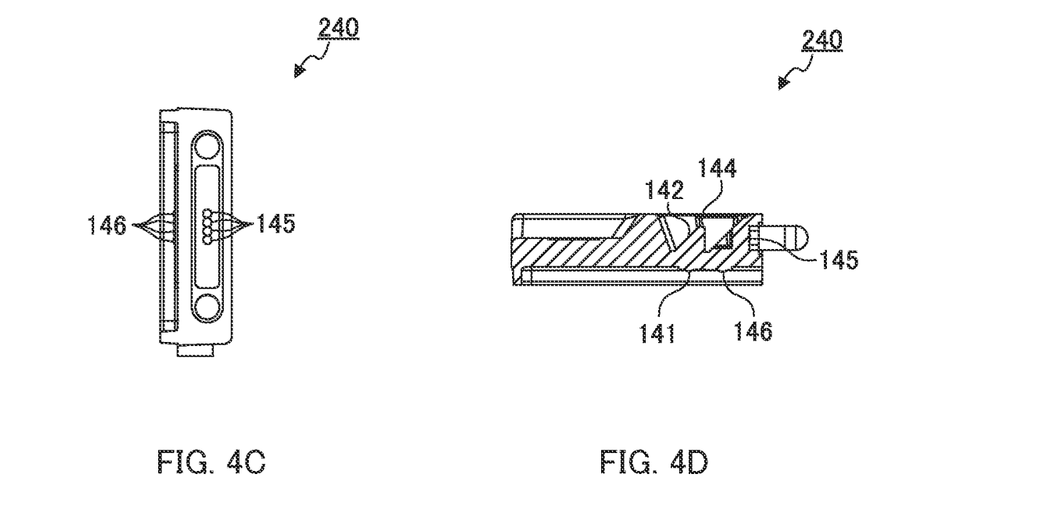
Figure 5A:
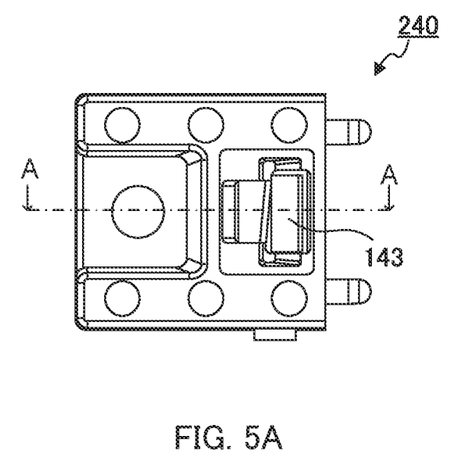
FIGS. 5A to 5D are other views illustrating the configuration of the optical module according to Embodiment 2.
Figure 5B:
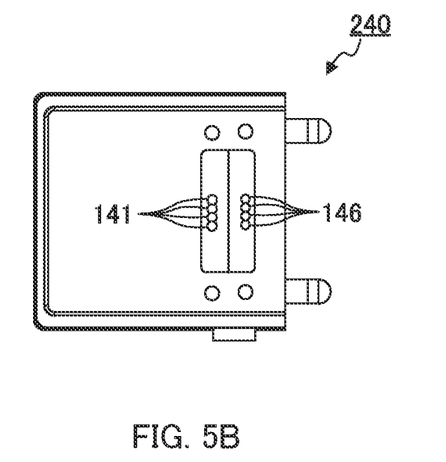
Figure 5C:
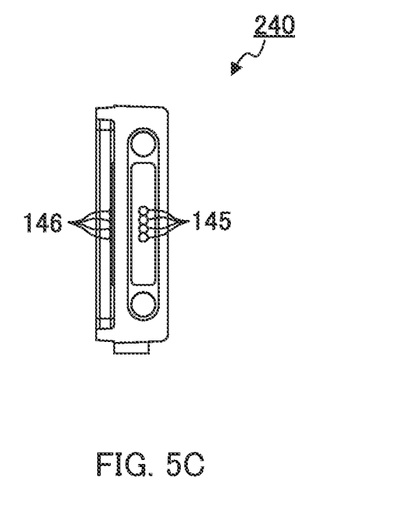
Figure 5D:
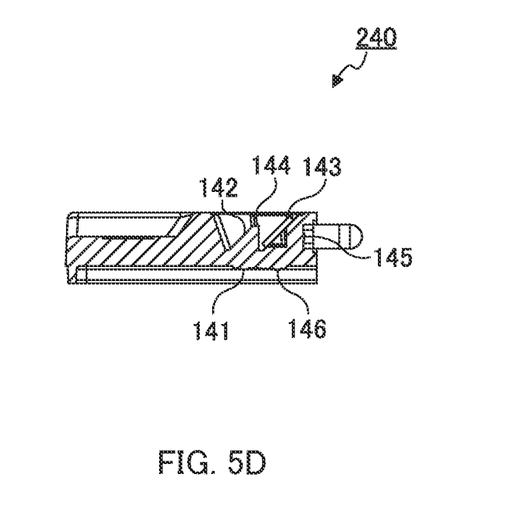

FIGS. 4A to 4D illustrate the configuration of optical receptacle 240 in which transmissive reflective part 143 is not disposed, and FIGS. 5A to 5D illustrate the configuration of optical receptacle 240 in which transmissive reflective part 143 is disposed. FIGS. 4A and 5A are plan views of optical receptacle 240 of the optical module according to Embodiment 2, FIGS. 4B and 5B are bottom views, FIGS. 4C and 5C are right side views, and FIGS. 4D and 5D are sectional views taken along line A-A indicated in FIGS. 4A and 5A.

As illustrated in FIGS. 4A to 4D and 5A to 5D, optical receptacle 240 of the optical module according to Embodiment 2 includes a plurality of first optical surfaces 141, reflective surface 142, transmissive reflective part 143, a plurality of recesses 144, a plurality of second optical surfaces 145, and a plurality of third optical surfaces 146. In the present embodiment, the plurality of optical transmission members 160 are attached to the optical receptacle via a known attachment means while housed in a multi-core collective connector.

The number of optical transmission members 160, the number of light emitting elements 122, and the number of light receiving elements 123 are not particularly limited as long as a plurality of optical transmission members, a plurality of light emitting elements, and a plurality of light receiving elements are provided. In the present embodiment, the number of optical transmission members 160, the number of light emitting elements 122, and the number of light receiving elements 123 are four, respectively.

(Effects)

As described above, the optical module according to the present embodiment has the same effects as the optical module according to Embodiment 1.

The present patent application claims the benefit of priority based on Japanese Patent Application No. 2018-164292 filed on Sep. 3, 2018. The disclosure of the specification, drawings and abstract of the Japanese Patent Application is incorporated in the specification of the present application by reference in its entirety.

INDUSTRIAL APPLICABILITY

The optical module according to the present invention is useful, for example, for optical communication using an optical transmission member.

REFERENCE SIGNS LIST

100 Optical module
120 Photoelectric conversion device
121 Substrate
122 Light emitting element
123 Light receiving element
124 Light emitting surface
125 End surface
126 Light receiving surface
140, 240 Optical receptacle
141 First optical surface
142 Reflective surface
143 Transmissive reflective part
144 Recess
144a First side surface
144b Second side surface
145 Second optical surface
146 Third optical surface
160 Optical transmission member
162 Ferrule Lr Reception light
Ls Signal light

What is claimed is:

1. An optical module, comprising:
a photoelectric conversion device including a substrate, a light emitting element disposed on the substrate, and a light receiving element disposed on the substrate; and
an optical receptacle disposed on the photoelectric conversion device and configured for optical coupling between each of the light emitting element and the light receiving element and an end surface of an optical transmission member when the optical transmission member is connected to the optical receptacle, wherein:
the optical receptacle includes:
a first optical surface for allowing incidence of signal light emitted from the light emitting element;
a second optical surface for emitting, toward the end surface of the optical transmission member, the signal light incident on the first optical surface, and allowing incidence of reception light emitted from the optical transmission member;
a transmissive reflective part for transmitting, toward the second optical surface, the signal light incident on the first optical surface, and reflecting, toward the light receiving element, the reception light incident on the second optical surface;
a recess for housing the transmissive reflective part; and
a third optical surface for emitting, toward the light receiving element, the reception light reflected by the transmissive reflective part,
the transmissive reflective part is fixed to an inner surface of the recess only at a position other than an optical path of the signal light, and
an optical path inside the recess as seen along a direction of a normal to the substrate is inclined with respect to an optical path between the second optical surface and the recess.

2. The optical module according to claim 1, further comprising:
a reflective surface disposed on an optical path between the first optical surface and the recess, and configured to reflect, toward the transmissive reflective part, light incident on the first optical surface.

3. The optical module according to claim 2, wherein
the transmissive reflective part as seen in a section along a surface of the substrate is disposed orthogonally with respect to the optical path inside the recess.

4. The optical module according to claim 1, wherein
the transmissive reflective part as seen in a section along a surface of the substrate is disposed orthogonally with respect to the optical path inside the recess.

5. An optical module, comprising:
a photoelectric conversion device including a substrate, a light emitting element disposed on the substrate, and a light receiving element disposed on the substrate; and
an optical receptacle disposed on the photoelectric conversion device and configured for optical coupling between each of the light emitting element and the light receiving element and an end surface of an optical transmission member when the optical transmission member is connected to the optical receptacle, wherein:
the optical receptacle includes:
a first optical surface for allowing incidence of signal light emitted from the light emitting element;
a second optical surface for emitting, toward the end surface of the optical transmission member, the signal light incident on the first optical surface, and allowing incidence of reception light emitted from the optical transmission member;
a transmissive reflective part for reflecting, toward the second optical surface, the signal light incident on the first optical surface, and transmitting, toward the light receiving element, the reception light incident on the second optical surface;
a recess for housing the transmissive reflective part; and
a third optical surface for emitting, toward the light receiving element, the reception light transmitted through the transmissive reflective part,
the transmissive reflective part is fixed to an inner surface of the recess only at a position other than an optical path of the signal light, and
an optical path in the recess as seen along a direction of a normal to the substrate is inclined with respect to an optical path between the second optical surface and the recess.

6. The optical module according to claim 5, wherein
the transmissive reflective part as seen in a section along a surface of the substrate is disposed orthogonally with respect to the optical path inside the recess.

7. The optical module according to claim 5, further comprising:
a reflective surface disposed on an optical path between the recess and the third optical surface, and configured to reflect, toward the third optical surface, the reception light transmitted through the recess.

8. The optical module according to claim 4, wherein
the transmissive reflective part as seen in a section along a surface of the substrate is disposed orthogonally with respect to the optical path inside the recess.

* * * * *